Figures 1, 2:
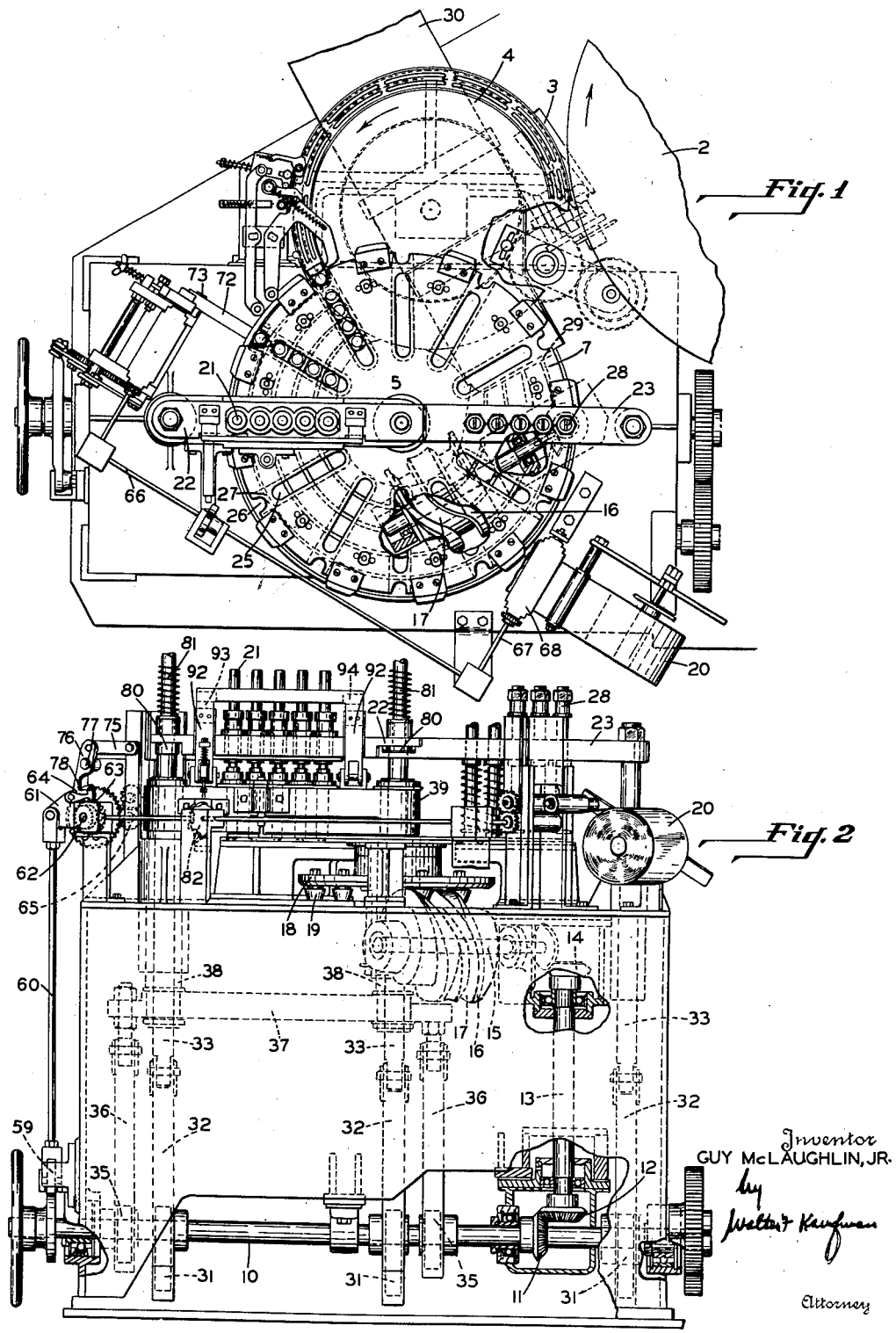

Jan. 11, 1955

G. McLAUGHLIN, JR 2,699,197

MACHINE FOR APPLYING SPOTS TO CROWN CLOSURES

Filed Dec. 31, 1951

5 Sheets-Sheet 1

Inventor
GUY McLAUGHLIN, JR.
by
Walter J Kaufman
Attorney

Jan. 11, 1955
G. McLAUGHLIN, JR
2,699,197
MACHINE FOR APPLYING SPOTS TO CROWN CLOSURES
Filed Dec. 31, 1951
5 Sheets-Sheet 2
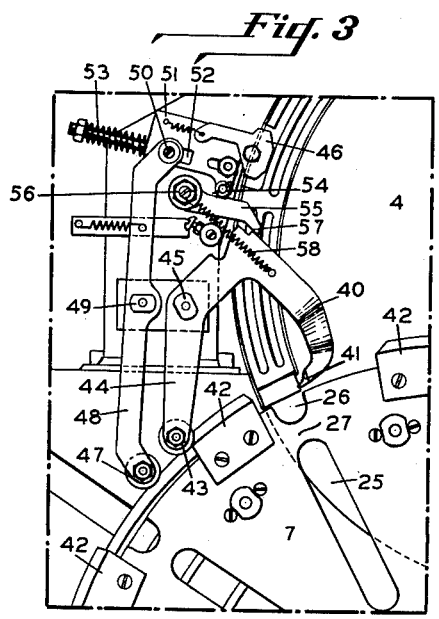
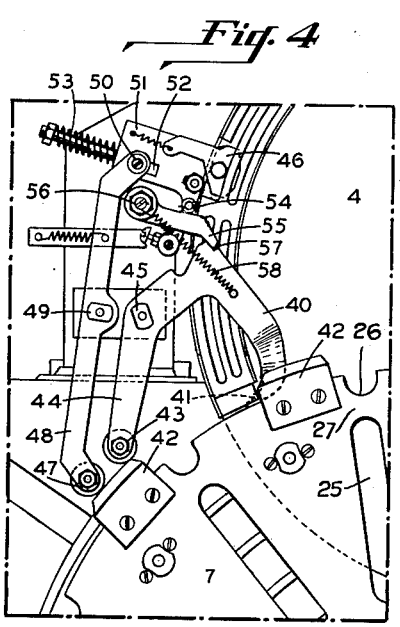
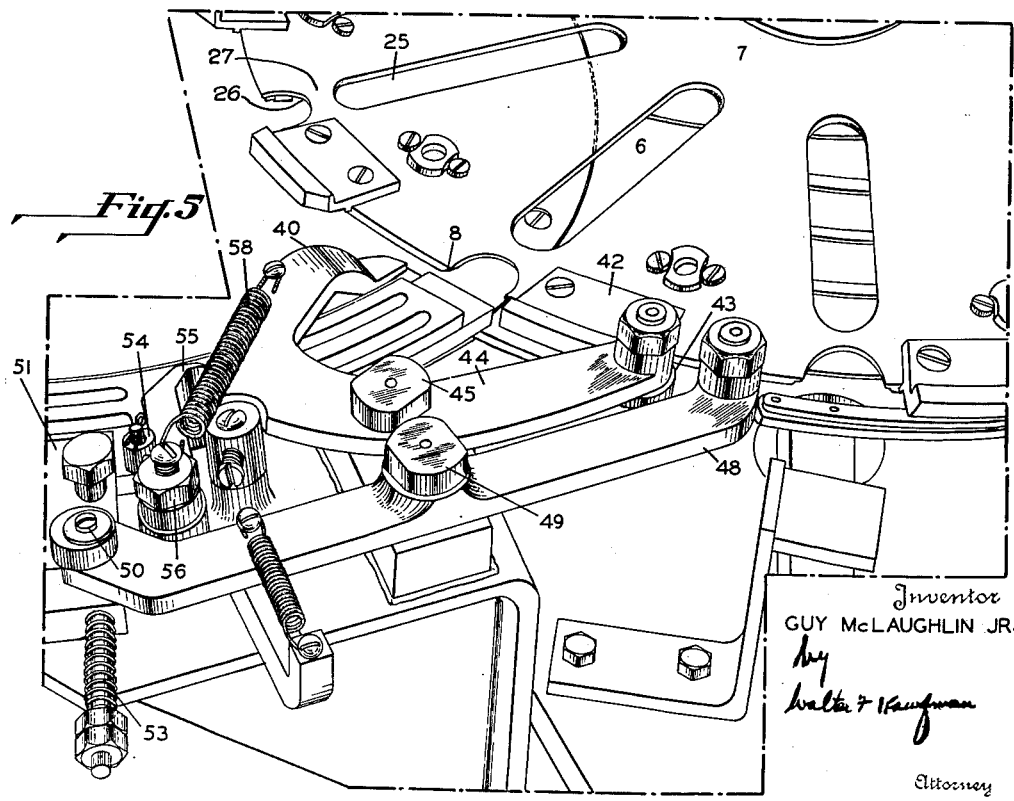
Inventor
GUY McLAUGHLIN JR.
by
Walter F Kaufman
Attorney

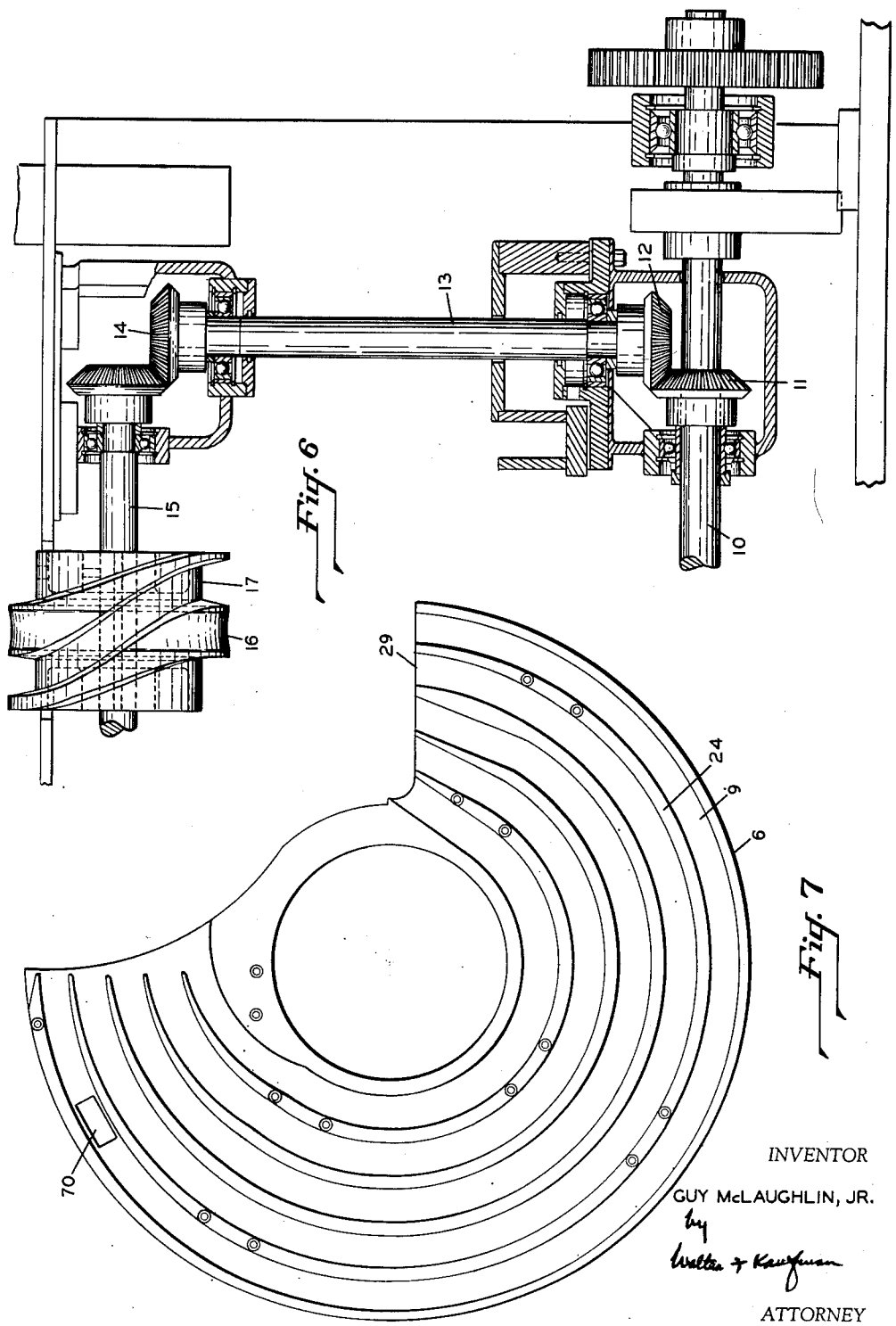

Jan. 11, 1955   G. McLAUGHLIN, JR   2,699,197
MACHINE FOR APPLYING SPOTS TO CROWN CLOSURES
Filed Dec. 31, 1951   5 Sheets-Sheet 5
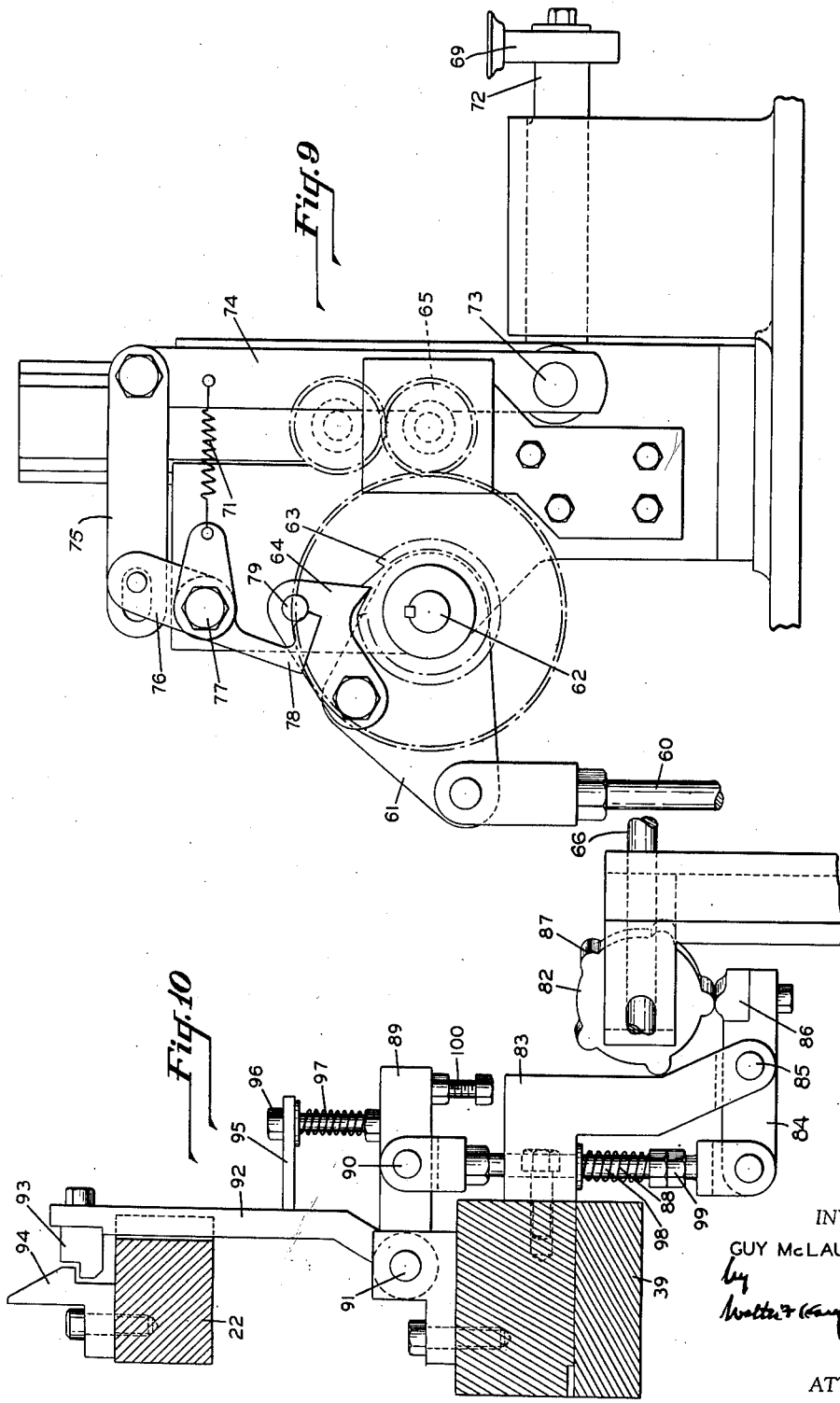
INVENTOR
GUY McLAUGHLIN JR.
by
Walter F. Kaufman
ATTORNEY

United States Patent Office 2,699,197
Patented Jan. 11, 1955

2,699,197

MACHINE FOR APPLYING SPOTS TO CROWN CLOSURES

Guy McLaughlin, Jr., Lancaster, Pa., assignor to Armstrong Cork Company, Lancaster, Pa., a corporation of Pennsylvania Application December 31, 1951, Serial No. 264,333

5 Claims. (Cl. 154—1.5)

This invention relates to a machine for manufacturing closures, and more particularly to a device for placing the center spot on crown liners to prevent the lining material from being deleteriously affected by the contents of the bottle, and vice versa.

It has been common practice in the past to take the crowns from a conventional lining machine and place them in a hopper for feeding in a continuous stream to a single punch spotting machine, whereby a spot of metal foil or other suitable spotting material is cut from a ribbon of spotting material and deposited in the center of the crown liner. This is necessary due to the fact that no spotting machine had been developed which will operate fast enough to accommodate the quantity of crowns coming from one assembly machine. In order to adequately take care of production, it was necessary to utilize several spotting machines to spot the crowns produced by one crown assembly machine.

In order to overcome the disadvantages of the prior art apparatus for spotting crowns, the present invention has been developed, which discloses a multipunch spotting device in which the crowns are spotted in groups of five so that the crowns may be fed directly from the assembly machine to the spotting machine without necessitating the extra operation of accumulating the crowns from the assembly machine and running them through an aligning hopper to bring them to the spotting attachment. The present machine is capable of spotting crowns at the rate at which they are assembled on the conventional assembly drum and is preferably operated at the same speed as the speed of drum. It may, if desired, be operated at a speed slightly in excess of the speed of the assembly drum.

In addition to the saving effected in the handling of the crowns, the present machine also utilizes the spotting material more economically, inasmuch as the spots are punched from a wide ribbon of material and the skeleton between the cut-out portions for a given number of crowns is substantially less than the skeleton resulting from the single spotting devices currently used.

In adhering spots to cork liners, it has been common practice in the industry to heat the cork disk before the spot is applied so that the heat of the liner will activate the adhesive on the spot to properly affix the spot to the liner. In operating at the speeds usually encountered in single spotting machines, it is difficult to control the heating device to heat the cork disk to the proper temperature to activate the adhesive without scorching the cork liner. With a device of the type here under consideration, the rate of operation per crown is considerably slower than with the single line devices and accurate control of the heating units is possible, insuring a higher quality product and fewer rejected crowns.

In single line spotting devices, the speed of operation is so great that it is necessary to hold the spots under a traveling tamper immediately after the spot has been applied. In order to maintain high production rates, it has been found necessary to utilize as many as forty-two hold-down tampers to adequately take care of production. If crowns with defective spots were encountered on the inspection belt, it was difficult to determine which hold-down tamper was causing the defect, and a large amount of down time was required to correct the matter. With a device operating at the speed of the one here under consideration, it is possible to properly do the tamping job with a series of stationary tampers—one for each crown of a group going through the machine. With this arrangement, it is relatively easy to determine the source of defective spots. The reason for this will be obvious upon reading the application.

An object of this invention is to provide a device which is capable of spotting crowns at a rate substantially the same or slightly greater than the rate at which the liners are assembled in the crowns on the assembly machine.

Another object of this invention is to provide a machine which will punch spots from a relatively wide ribbon of material, using the spotting material more advantageously than is possible with a single spotting apparatus.

A still further object of this invention is to provide a means whereby a given number of crowns will be fed to the spotting machine at one time and whereby no crowns will be fed unless the required number is available for feeding to the machine.

A still further object of this invention is to prevent the indexing of the spotting tape in the event one series of crowns is not fed to the machine.

Another object of this invention is to provide a device whereby the cutting punches will not operate in the event crowns are not fed to the machine.

Another object of this invention is to provide a device which operates sufficiently fast to take care of the maximum production of crowns from a conventional crown assembly device but at the same time operates sufficiently slow with respect to each crown to properly heat the liner to activate the adhesive on the spot without the danger of scorching the cork liner.

Another object of this invention is to provide a device which operates at a speed to enable the crown to be held for a sufficiently long period of time under a fixed tamper to properly adhere the spot to the liner.

Figure 8:
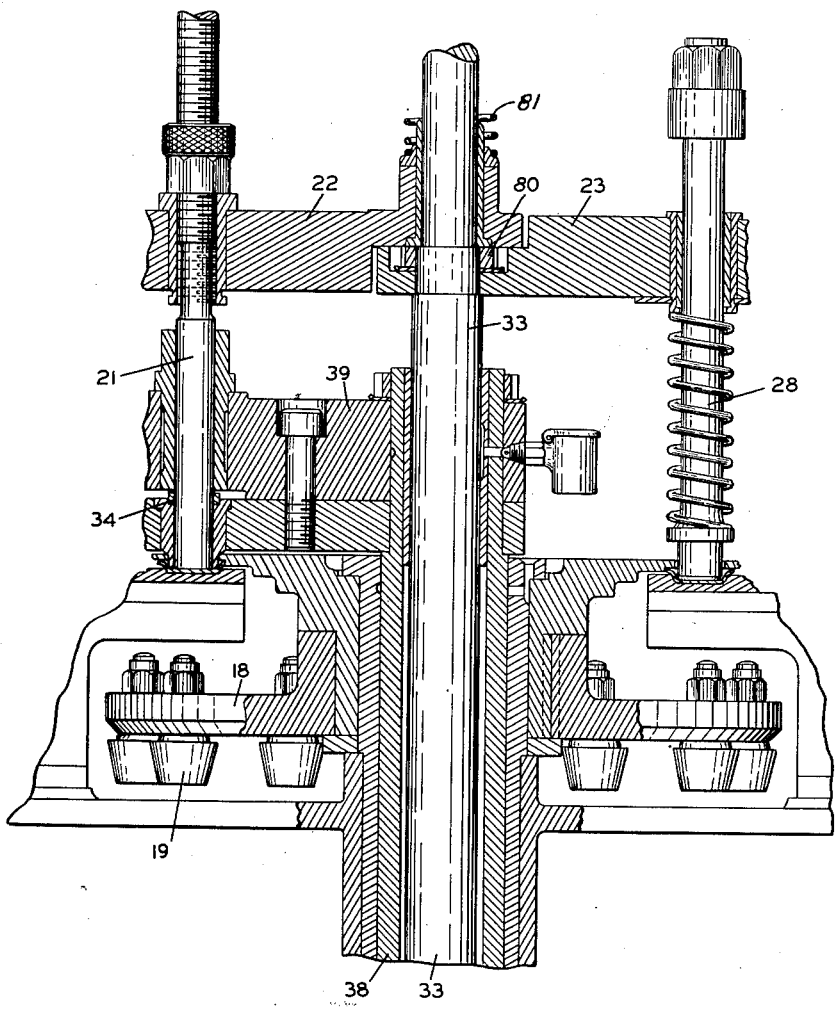

In order that the invention may be more readily understood, it will be described in connection with the attached drawings in which:

Figure 1 is a top plan view of the spotting machine;
Figure 2 is a front elevational view of the machine;
Figures 3, 4, and 5 are detailed views of the mechanism for aligning the crowns preparatory to feeding the same to the spotting attachment and the means for arresting the feeding of crowns in the event a sufficient number is not present for feeding;
Figure 6 is a detailed drawing of the drive mechanism for imparting intermittent motion to the device;
Figure 7 is a top plan view of the stationary table over which the crowns move during the spotting operation;
Figure 8 is a detailed cross sectional view of the punch and die mechanism and the tamping mechanism;
Figure 9 is a detailed view of the tape indexing mechanism; and
Figure 10 is a detailed view of the mechanism for arresting the motion of the punches in the event crowns have not been fed to the machine.

Referring to Figure 1, there is shown a portion of a conventional crown and liner assembly drum designated by the numeral 2. This drum performs the operation of adhesively securing cushion liners to metal crowns. The assembly drum shown in Figure 1 rotates in the direction of the arrow. The lined crowns traveling along the periphery of the assembly drum are engaged by a stationary finger 3, which guides them from the assembly drum 2 to a turntable 4, rotating in the direction of the arrow. The turntable 4 carries the crowns sequentially in a continuous stream along its outer periphery and feeds them in groups into a spotting machine shown generally at 5.

The purpose of the turntable 4 is to serve as a surge conveyor to provide a plurality of crowns for feeding to the spotting device. The proper feeding of crowns is highly important in the successful operation of the spotting device. The turntable 4 must be so constructed that the frictional drag of the crowns thereon will be slight enough to enable the turntable to continuously rotate without damaging the crowns, regardless of whether it is moving crowns or whether it is sliding under stationary crowns; but the frictional drag between the crown and the turntable must be great enough so that the turntable will move the crowns rapidly as soon as an opening is present in the spotting machine to receive the crowns.

It has been found that the conventional metal turntable is not suitable for this purpose because, due to the lightness of the crowns, the turntable will not move the crowns fast enough to propel them into the spotting machine in the brief period of time available. However, a metal turntable with permanent magnets mounted therein has been found to be highly satisfactory for accomplishing this purpose.

The spotting machine comprises a stationary guide plate 6, shown in detail in Figure 7. The crown are fed to the guide plate 6 from the turntable 4 in a radial direction in groups of five. This guide plate 6 in the particular embodiment here under consideration comprises five channels or paths 9 in which the crowns are moved around the plate to spotting and tamping stations. It will be understood, of course, that since the crowns are fed to the guide plate 6 radially in groups, of five, they will move in a direction normal to the direction in which they are fed to the device so that as the group moves around the plate only one crown of each group will be in a given channel.

Positioned above the guide plate 6 is an indexing plate 7 having radially cut-out portions 8 (Figure 5) on its undersurface disposed approximately at right angles to the channels 9 in the guide plate 6. The indexing plate 7 is so positioned that the radial cut-out portions 8 will be disposed in the path of travel of the crowns carried on the periphery of turntable 4 as the plate 7 indexes so that the crowns will be fed into the cut-out portions 8 on the underneath side of the indexing plate. After the crowns have been fed to the cut-out portion 8, they are moved along the channels 9 in guide plate 6 by means of their engagement with the indexing plate 7 in the manner hereinafter described.

Because of the spacing of the punches, it is necessary that the crowns be properly positioned so that the foil spot applied to the liner by the punch will be properly centered. As the crowns are fed to the indexing plate 7 from the turntable 4, they are in abutting relationship to one another and are held in a straight line by the cut-out portion 8 on the underside of the indexing plate. The crowns are properly spaced in a radial direction by the channels 9 as the indexing plate moves them therealong. It will be noted from an observation of Figure 7 that the distance between the channels increases immediately after the crowns start on their path of travel along the channels. The walls 24 between the channels properly space the crowns radially so that the punches 21 will position the spot in the exact center of the crown.

Referring to Figure 2, there is shown a main drive shaft 10 positioned at the bottom of the machine. The indexing plate 7 is driven from this drive shaft by means of miter gear 11 keyed to the shaft 10, which engages miter gear 12 on vertical drive shaft 13, at the top of which is positioned another set of miter gears 14, which drive horizontal shaft 15. Keyed to the horizontal shaft 15 is a cylindrical cam 16 having a curved cam track 17 machined therein. Attached to the bottom of the indexing plate 7 is a follower plate 18, on which are mounted a plurality of follower rollers 19 for engagement with the cam track 17 of the cylindrical cam 16. The number of follower rollers 19 corresponds to the number of cut-out portions 8 in the indexing plate 7. In the embodiment illustrated, there are twelve cut-out portions 8 and twelve follower rollers 19. With this arrangement, each revolution of the cylindrical cam 16 moves the indexing plate one-twelfth of a revolution, or the distance between two of the cut-out portions 8. As the cylindrical cam 16 engages one follower roller 19, rotation of the cam will move the follower roller in a counterclockwise direction, and through the follower plate 18 will impart rotary motion to the indexing plate 7. The cam track 17 of the cylindrical cam 16 is such that during a major portion of the rotation of the cylindrical cam, the follower plate 18 will not be rotated; and during the balance of the portion of rotation, the cylindrical cam 16 will move the indexing plate a distance equal to the distance between the cut-out portions 8 on the underside of the indexing plate. With this setup, an intermittent motion is imparted from the drive shaft 10 to the indexing plate 7.

This intermittent motion of the indexing plate 7 carries a group of crowns positioned radially in the cut-out portion 8 of the indexing plate 7 around in the channels 9 of the guide plate 6 through various processing stations. The first operation performed on the lined crowns is that of punching spots from a ribbon of spotting material such as light gauge metal foil. This ribbon is shown in Figure 2 on the roll 20. The ribbon passes through under a plurality of punches 21 positioned on a punch tie bar 22. The positioning of the punches 21 in the tie bar 22 is such that the punches will be aligned with the crowns carried in the cut-out portion 8. One punch 21 is provided for each channel 9. The indexing plate 7 is provided with elongated openings 25 positioned above the cut-out portions 8. Through these openings 25 the punches operate to position the spots centrally on the liner of the crowns. It will be noted that the outer punch 21 operates through a semicircular recess 26 in the edge of the indexing plate 7, and the other four punches operate through the openings 25. The purpose of this structure is to reinforce the indexing plate 7 by means of the web of metal 27 between the recesses 26 and the elongated openings 25.

After the spots have been placed on the crowns, the crowns are moved along the channels 9 of the guide plate 6 by means of the indexing plate 7 until they reach a point 180 degrees from the punches 21, at which place the spots are engaged by a series of cooled tampers 28, which are positioned on a tamper tie bar 23. These tampers 28 exert pressure to the spot to properly adhere the same to the lining material. The tampers 28 are cooled to prevent the adherence of the foil spot to the tampers. The tampers 28 operate through the same openings 25 and 26 as do the punches 21. After passing through under the tampers on the next move of the indexing plate 7, the crowns are moved to a cut-out portion 29 in the guide plate 6 and drop onto a conveyor shown schematically at 30. This is an inspection conveyor on which the crowns pass an inspector before they are conveyed to a suitable receptacle.

The reciprocatory motion for the punches 21 and the tampers 28 is imparted by means of the common drive shaft 10 through eccentrics 31 and connecting rods 32, which are attached to the push rods 33, to which the tie bars 22 and 23 are secured. With this drive mechanism, each rotation of the drive shaft 10 will raise and lower the punches 21 and tampers 28; and, as explained earlier, each time the shaft 10 rotates, the indexing plate 7 will move one station, bringing a new series of crowns in position under the punches 21 and another series in position under the tampers 28. The drive shaft 10 also imparts reciprocatory motion to the dies 34 (Figure 8), through which the punches 21 operate to punch the spotting material from the ribbon. The dies 34 do not reciprocate through as great a distance as the punches 21. This reciprocatory motion to the dies is imparted by means of the two eccentrics 35 operating through connecting rods 36, which are attached to a lower tie bar 37, on which are mounted push rods 38 which operate the die nest 39, mounted for sliding movement on the push rods 33. With this structure, each time the shaft 10 makes a revolution, the die nest 39 will also go through one cycle of raising and lowering, but its traveling distance is substantially less than that of the punches 21 and tampers 28.

In order to operate the spotting device efficiently, it has been found preferable to operate the turntable 4 at a speed slightly in excess of the speed of the assembly drum 2; therefore, the crowns coming from the assembly drum 2 onto the turntable 4 are speeded up so as to maintain a reservoir of crowns for instantaneous feeding to the spotting machine. Since the spotting attachment is operated at the same speed as the speed of the assembly drum, there are times, due to the inefficiencies of the assembly drum, that the maximum number of crowns (in the embodiment here under consideration—five) will not be available for feeding to the cut-out portion 8 in the indexing plate 7. When this occurs, it is desirable to feed no crowns to the indexing plate until the full complement of five is available. This will prevent the cutting of a spot and depositing it on the guide plate 6 in the event no crowns are in position under the punch 21.

In order to accomplish crown withholding until the desired number of crowns is available, the mechanism illustrated in Figures 3, 4, and 5 has been devised. This mechanism comprises a finger 40, the curved end 41 of which is adapted to engage a crown in position to enter the cut-out portion 8 in the indexing plate 7. After a series of five crowns has been fed to a cut-out portion 8 in line with the stream of crowns traveling along the periphery of turntable 4, on the next move of the indexing plate 7, plate cam 42 positioned on the periphery of the indexing plate 7 will engage a cam roller 43 attached to arm 44, which pivots about point 45 and carries on its other end the finger 40. The plate cam 42 moves the roller 43 away from the indexing plate 7, pivoting the arm 44 about point 45 and forcing the point 41 on the end of finger 40 across the path of travel of the oncoming crowns. The crowns are held on the periphery of the turntable 4 by the indexing plate 7 until the next cut-out portion 8 is positioned in alignment with the crowns on the turntable. When the cut-out portion 8 is in position, the crowns are free to be fed to the indexing plate unless such feeding is withheld by the finger 40. When the cut-out portion 8 is in position in front of the path of travel of the crowns, if the desired number of crowns is lined up and waiting to be fed to the indexing plate, the detector 46 will engage the skirt of the sixth and seventh crowns in line. This detector 46 is pivotally mounted so that it will adjust itself to engage the skirts of the crowns without damaging them. As plate cam 42 advances with the indexing plate, it also engages cam roller 47 attached to arm 48 pivoted about pivot point 49. The other end of arm 48 is pivotally attached at 50 to a plunger 51 carrying the detector 46. Arm 48 is not rigidly attached to the plunger 51 but merely operates through a groove 52 in the plunger 51. The arm 48 serves only to retract detector 46 from the path of travel of the crowns. The detector moves into engagement with the crowns by means of the spring 53. Since the deetctor 46 has contacted the sixth and seventh crowns, it is evident that five crowns are available for feeding to the indexing plate 7; therefore, the curved end of finger 40 will be withdrawn from its position across the path of travel of the crowns by means of spring 58 as soon as plate cam 42 has passed roller 43.

In the event the detector 46 does not engage crowns in the track on the periphery of the turntable 4, plunger 51 will force detector 46 across the path of travel of the crowns by means of spring 53. This forward movement of the plunger 51 moves roller 54, which is mounted on the plunger 51 along the surface of a pawl 55, which is pivotally mounted to the bracket carrying arms 44 and 48 at a point 56. As the roller 54 moves along the pawl 55, it forces the pawl 55 into a notch 57 in the finger 40 and prevents the spring 58 from withdrawing the finger from its position in front of the crowns after plate cam 42 is no longer in engagement with roller 43. The point 41 thereby blocks the flow of crowns into the cut-out portion 8 of the indexing plate 7. It will be clear that with this device no crowns will be fed to the assembly machine unless a complete complement of crowns sufficient to fill all the channels 9 in the guide plate 6 are available.

In the event no crowns are fed to the machine, it is desirable to prevent the indexing of the tape from the roll 20 in order to conserve material. The indexing of the tape is accomplished by a cam 59 attached to the end of the main drive shaft 10, to which is connected a push rod 60. Rotation of the cam 59 imparts reciprocatory motion to the push rod 60 and causes the bell crank 61 to move through an arc. Bell crank 61 moves freely on shaft 62 to which is keyed a ratchet 63, said ratchet being capable of engagement by a pawl 64 mounted on the bell crank 61. As the push rod 60 is moved upwardly, it swings bell crank 61 around shaft 62 in a clockwise direction, and pawl 64 engages ratchet 63, moving the same one notch and rotating the shaft 62 a comparative distance. Shaft 62 is geared to a drive roller 65, which is one member of a pair of tape feed rolls which index the tape. The distance which the pawl 64 moves around the ratchet 63 is sufficient to move the tape the required distance to present a new area of spotting material to the five punches 21. The shaft 62 carries a set of miter gears, which in turn impart intermittent indexing motion to the shaft 66, which in turn has a set of miter gears which imparts indexing motion to shaft 67, which carries a second tape-engaging roll 68 located at the other side of the machine. The two rolls 65 and 68 impart positive motion to the tape being fed through the machine. It will be clear from this description how the tape is indexed each time the drive shaft of the machine makes one complete revolution.

In the event the finger 40 prevents the feeding of crowns to the machine, this will be detected by a roller 69 (Figure 9) so positioned as to engage the outermost crown of the group of five crowns when the indexing plate 7 has been indexed one station from the point at which the crowns are supplied to the indexing plate 7. This is accomplished by a recess 70 in the guide plate 6 into which roller 69 moves. If a crown is present, the roller 69 will be held down by the crown on the guide plate 6; however, if no crown is present, the roller will move up into the opening 70 by the tension of spring 71, pivoting the roller carrying arm 72 about pivot point 73. Connected to arm 72 and also pivoting about point 73 is a vertical arm 74 which pivots with arm 72. Movement of arm 74 to the left also moves link 75 to the left, carrying with it the upper end of latch 76, one end of which is mounted to link 75 and the center of which pivots about pivot point 77. This movement of the link 75 causes the hook 78 on the end of latch 76 to engage a pin 79 on pawl 64. When hook 78 holds pawl 64 out of engagement with ratchet 63, the movement of the bell crank 61 does not impart indexing motion to the ratchet 63 and consequently does not impart motion to rollers 65 and 68, and the tape does not index through the machine. However, if a crown is present over the recess 70, the upward movement of the roller 69 is halted thereby and the hook 78 does not engage pin 79 on the pawl 64, permitting the tape to index normally. It will, therefore, be seen that if no crowns are supplied to one of the cut-out portions 8, the tape will not index and will not supply spotting material to the area in which the punches operate at the time the empty cut-out portion 8 is positioned under the punches.

If crowns are not fed to the device and the tape does not index, but the punches are allowed to operate normally, they will pass through the holes which were punched by the previous stroke of the punches in spotting the preceding series of crowns; however, due to the light weight of the foil material used in spotting and the slight tape movement in the machine, there is a tendency for this spotting material to shift slightly, causing the punches to punch slivers of spotting material from the edges of the previously cut holes. These slivers adhere to the bottom of the punches and deleteriously affect subsequently punched spots. In order to overcome this objection, it has been found desirable to arrest the motion of the punches in addition to arresting the indexing of the tape in the event a complement of crowns is not supplied to the machine.

To provide a mechanism whereby the punch tie bar 22 can be withheld and the tamper tie bar 23 will continue to operate, even though the reciprocatory motion to both is imparted by the eccentrics 31 through connecting rods 32 and push rods 33, the mounting is such that tamper tie bar 23 is affixed to two of the push rods 33 while punch tie bar 22 is capable of free movement on the push rods but is engaged on its underneath surface by shoulders 80 on two of the push rods 33. These shoulders 80 carry the punch tie bar 22 up with the push rod but the tie bar and punches are moved downwardly by means of springs 81 surrounding the upper portion of the push rods. This arrangement permits the punch tie bar 22 to be held from downward motion during one or more cycles of the machine, while the tamper tie bar 23 continues to operate with each cycle of the machine.

The operation of the punches is controlled by a five-pointed cam wheel 82 mounted on shaft 66, which is the drive shaft from the roller 65 to the roller 68 of the tape indexing system. When the tape is indexed as described earlier, the cam wheel 82 makes one-fifth of a revolution, or the distance between two cam points, during each cycle of the machine. Attached to the die nest 39 is a bracket 83 (Figure 10), on the lower extremity of which is a rocker arm 84 pivoting about pivot point 85. The one end of rocker arm 84 is provided with a cam follower 86.

During the normal operation of the machine, when the tape is indexing and cam wheel 82 is turning intermittently, the rocker arm 84, with the cam follower 86, will move up and down with the die nest 39. The positioning of the cam follower 86 is such that it will be received in the space between two of the points 87 on the cam wheel 82.

In the event no crowns are fed to the machine, the cam wheel 82 will not move, and one of the points 87 is in register with the follower 86. When the follower 86 strikes the point 87 on cam wheel 82, it pivots rocker arm 84 about pivot point 85, moving the opposite end of the rocker arm 84 in an upwardly direction. Pivotally attached to the end of rocker arm 84 is a push rod 88, the upper end of which is pivotally attached to a second rocker arm 89 at point 90. The one end of rocker arm 89 pivots about pivot point 91 secured to die nest 39. Also pivoted about pivot point 91 is a vertical arm 92, which carries a dog 93 at its upper extremity. Dog 93 is designed to engage a latch 94 attached to punch tie bar 22. Extending radially from vertical arm 92 is an extension 95. A stud 96 passes freely through a hole in the extension 95 and is threaded into rocker arm 89. Surrounding stud 96 is a spring 97, which is compressed. As rocker arm 89 is moved in an upward direction, it moves the stud 96 upward, and the spring 97 through extension 95 moves vertical arm 92 to the left so that dog 93 engages latch 94 and holds tie bar 22 from moving downwardly.

In the event the dog 93 moves in before the latch 94 on the tie bar 22 has reached the top of its path of travel, the latch will merely force the dog outwardly, compressing spring 97; and the spring will return the dog as soon as the latch has passed. During normal operation of the machine, the dog 93 is held out of engagement with latch 94 by means of spring 98 surrounding push rod 88 and compressed between the bottom side of bracket 83 and the nut 99 on the push rod. Expansion of this spring forces push rod 88 down, pulling rocker arm 89 down and allowing vertical arm 92 to move to the right so that latch 94 will clear dog 93 as the tie bar 22 carrying the latch moves down. The clearance between latch 94 and dog 93 is adjustable by means of stud 96, which is screw threaded in the rocker arm 89. The downward movement of push rod 88 is limited by an adjusting stud 100, which abuts the bracket 83 as the rocker arm 89 is pulled down by the spring 98.

In the operation of this device, crowns are supplied from the assembly drum 2 to a turntable 4 by means of the guide finger 3, which deflects the crowns from the assembly drum onto the turntable. As the crowns are carried around the turntable 4, they are fed into a cut-out portion 8 on the underneath side of an intermittently rotated indexing plate 7. In the embodiment here under consideration, the cut-out portions 8 are sufficiently long to accommodate five crowns.

As the five crowns are fed into the cut-out portion 8, the plate indexes one-twelfth of a revolution, sliding the crowns over the stationary guide plate 6, each crown traveling in one of the channels 9 on the plate. At the start of their intermittent path of travel over the guide plate 6, the crowns are in abutting relationship with one another; however, the spacing between the channels 9 increases as the crowns move therealong, and the crowns are properly spaced so that they will not be in abutting relationship and will be properly centered under the punches 21 positioned in a tie bar 22. These punches 21 reciprocate in a vertical direction, cutting spots of spotting material from a ribbon of tape 20, which is fed through under the punches in a diagonal direction with respect to the position of the punches 21 on the tie bar 22. The spots are cut from the ribbon by means of a die attached to the die nest 39, through which the punches reciprocate. After the punches have cut the spots from the tape and deposited them on the liners, the crowns move around the machine intermittently until they come to a point 180 degrees from the point at which the spots were placed on the liners, at which point a series of tampers contact the spots and firmly press the same onto the liners. On the next indexing operation, the crowns come to the end of the stationary guide plate 6 and drop off onto a conveyor 30, which carries them past an inspector to a suitable receptacle.

In the event five crowns are not available on the turntable 4 immediately adjacent the cut-out portion 8 at the time the indexing plate stops with one of the cut-out portions 8 directly in front of the path of the crowns, the forward motion of the crowns will be arrested by means of a point 41 on the end of finger 40, which will be forced across the path of travel of the crowns. This is accomplished by a detector 46 which is so positioned that it will contact the sixth and seventh crowns in the line waiting to be fed to the indexing plate 7. If the detector 46 contacts crowns, the five crowns in line will automatically be fed into the cut-out portion 8; however, if the detector mechanism does not contact crowns, the point 41 will be held across the path of travel of the crowns and no crowns will be fed. This is accomplished by the plate cam 42 secured to the rim of the indexing plate 7. This plate cam 42 contacts roller 43, pivoting arm 44 about pivot point 45, forcing the point 41 across the path of travel of the crowns. The plate cam 42 also contacts roller 47 carried on arm 48 pivoted about pivot point 49 which operates in a groove 52 on plunger 51 which carries the detector 46. If no crowns are present, the detector 46 will move forward into the path of travel of the crowns, carrying with it cam roller 54 on plunger 51. Cam roller 54 moves pawl 55 into a notch 57 in the finger 40, holding the finger pawl 55 into a notch 57 in the finger 40, holding the finger across the path of travel of the crowns. However, if detector 46 contacts crowns, plunger 51 cannot move forward; consequently, cam roller 54 will not force pawl 55 into notch 57 and the finger 40 will be moved out of the path of travel of the crowns by means of spring 58 immediately after the roller 43 moves off the plate cam 42.

The driving mechanism for the device comprises a main drive shaft 10 located along the bottom of the machine which, through suitable drive shafts and gearing assembly, drives a cylindrical cam 16 having a cam track 17 which engages follower rollers 19 attached to a follower 18 secured to the bottom of the indexing plate 7. The cam track 17 is so designed that during a major portion of a revolution of the cylindrical cam, the indexing is stationary; and during the remainder of the revolution of the cylindrical cam, the indexing plate is so indexed one-twelfth of a revolution. The next follower roller 19 is engaged by the track 17, which imparts the next indexing motion to the plate 7. The main drive shaft 10 also imparts reciprocating motion to the tie bars 22 and 23 by means of connecting rods 32, which operate on eccentrics 31 secured to the shaft 10. These connecting rods are coupled with push rods 33 which extend up through the machine to the tie bars 22 and 23. Also on the drive shaft 10 are another set of eccentrics 35, which operate connecting rods 36 attached to a lower tie bar 37 which operates the die nest 39. It will be seen, therefore, that each time the drive shaft 10 rotates, the indexing plate will index one-twelfth of a revolution, covering the distance between two of the cut-out portions 8. Also, on each revolution of the drive shaft 10 the tie bars 22 and 23 will complete one cycle of their reciprocatory motion, bringing the dies and punches down and back. The timing is such that the punch and die assembly moves down at the time the indexing plate is stationary. The punches operate through openings 25 and 26 in the indexing plate.

On the end of the drive shaft 10 is a cam 59 which operates a push rod 60 which actuates the tape-indexing mechanism through the assembly shown in Figure 9. This push rod 60 rocks bell crank 61 about shaft 62. Keyed to the shaft 62 is a ratchet 63. Mounted on the bell crank 61 is a pawl 64 which engages the ratchet 63. Each time the push rod 60 is raised, bell crank 61 moves in a clockwise direction about the shaft 62 and the pawl 64 engages one tooth of the ratchet 63, moving the same in a clockwise direction and rotating the shaft 62 to which the ratchet 63 is keyed. This intermittent motion imparted to the shaft 62 is carried to the drive roll 65, which is one of the rolls for the tape-feeding mechanism. Connected to the drive roll 65 by means of suitable shafts and gearing is a shaft 67 which is connected to another drive roll 68 at the other side of the machine; therefore, the tape is positively fed by means of pull rolls in each end of the machine.

In the event the crown feeding device described earlier does not permit five crowns to be fed to the machine, the tape indexing is halted by reason of the fact that a roller 69 which extends through an opening 70 in the guide plate 6 does not contact a crown which would normally be traveling in the outer channel 9 of the guide plate 6. When this happens, a spring 71 is allowed to move arm 74 in a counterclockwise direction, pivoting about pivot point 73, raising arm 72 with the roller 69 carried thereon. This counterclockwise motion imparted to the arm 74 moves link 75, carrying with it a latch 76, one end of which is attached to the link 75 and which pivots about point 77. This latch comprises a hook 78 which engages a pin 79 on the pawl 64. This prevents the pawl 64 from engaging a tooth on the ratchet 63 and, therefore, the movement of the bell crank does not rotate the ratchet and consequently the rolls 65 and 68 are not driven and the tape is not indexed. However, if the roller 69 contacts a crown in the outer channel, the roller is held down, the arm 74 could not move in a counterclockwise direction, the latch 76 does not engage pin 79, and the tape-indexing mechanism operates in its normal fashion.

It has been found desirable also to halt the downward motion of the punches in the event the tape has not been indexed. This is accomplished by a five-pointed cam wheel 82 mounted on the shaft 66 connecting the two drive rollers 65 and 68 for the tape-feeding device. This five-pointed cam wheel rotates the distance between two of its points each time the tape is indexed or each time the drive shaft 10 makes one revolution. Attached to the die nest 39 and movable therewith is a bracket 83, on the bottom of which is pivoted a rocker arm 84 which carries a cam follower 86 for engagement with one of the cam points 87 on the cam wheel 82. During normal operation of the device, the cam follower 86 rises with the die nest and is received between two of the cam points 87 on the wheel 82. However, if the tape is not indexed, the cam wheel 82 will stop in such position that one of its points 87 will contact cam follower 86 on rocker arm 84. This contact between cam point 87 and follower 86 pivots rocker arm 84 about pivot point 85, moving push rod 88 in an upward direction, pivoting a second rocker arm 89 in a counterclockwise direction, thereby moving vertical arm 92 in a counterclockwise direction so that dog 93 carried thereby will engage latch 94 on tie bar 22, preventing downward movement of the tie bar and punches.

The disclosure contained herein relating to the device for controlling the feeding of the crowns to the device is claimed in application Serial No. 264,332, in the names of Guy McLaughlin, Jr., John Lester Denlinger, and Benjamin Franklin Herr, filed concurrently herewith.

The disclosure contained herein relating to the device for indexing the spotting material and withholding the punches is claimed in application Serial No. 264,339, in the name of John Lester Denlinger, filed concurrently herewith.

The disclosure contained herein relating to the conveyor for transferring the crowns from the lining machine to the spotting machine is claimed in application Serial No. 264,340, in the name of Charles E. Procasco, filed concurrently herewith.

It will be clear from the above that I have developed a machine which will simultaneously spot a plurality of crowns at a speed sufficiently great to enable taking the crowns directly from a crown assembly machine and running them through a spot machine. While this invention has been disclosed illustrating spotting five crowns simultaneously, it will be understood that the same principles may be involved in handling lesser or greater numbers of crowns.

I claim:

1. In a device for applying spots to crown closures, the elements comprising a stationary guide plate having a plurality of substantially circumferentially disposed channels defined therein, means for simultaneously supplying one crown to each of said circumferentially disposed channels, an intermittently rotated plate positioned in juxtaposition to said stationary guide plate, means on said last-named plate to engage the crowns on said guide plate to move them therealong in their respective channels, a plurality of punch and die sets so positioned as to operate through openings in the intermittently rotated plate to register with crowns positioned in the channels of said stationary guide plate to place spots in a plurality of crowns simultaneously, and common means for imparting intermittent rotary motion to the rotating plate and reciprocatory motion to the punch and die sets.

2. In a device for applying spots to crown closures, the elements comprising a stationary guide plate having a plurality of substantially circumferentially disposed channels defined therein, means for simultaneously supplying one crown to each of said circumferentially disposed channels, an intermittently rotated plate positioned in juxtaposition to said stationary guide plate, means on said last-named plate to engage the crowns on said guide plate to move them therealong in their respective channels, a plurality of punch and die sets so positioned as to operate through openings in the intermittently rotated plate to register with crowns positioned in the channels of said stationary guide plate to place spots in a plurality of crowns simultaneously, a plurality of tampers to operate through the intermittently rotated plate to engage the crowns on said stationary guide plate, and common means for imparting intermittent rotary motion to the rotating plate and reciprocatory motion to the punch and die sets and the tampers.

3. In a device for applying spots to crown closures, the elements comprising a stationary guide plate having a plurality of substantially circumferentially disposed channels defined therein, means for simultaneously supplying one crown to each of said circumferentially disposed channels, an intermittently rotated plate positioned in juxtaposition to said stationary guide plate, means on said last-named plate to engage the crowns on said guide plate to move them therealong in their respective channels, a plurality of punch and die sets so positioned as to operate through openings in the intermittently rotated plate to register with crowns positioned in the channels of said guide plate to place spots in a plurality of crowns simultaneously, means for intermittently moving a ribbon of spotting material between the punches and dies, and common means for imparting intermittent rotary motion to the rotating plate, reciprocatory motion to the punch and die sets, and intermittent motion to the ribbon feeding means.

4. In a device for applying spots to crown closures, the elements comprising a stationary guide plate having a plurality of substantially circumferentially disposed channels defined therein, means for simultaneously supplying one crown to each of said circumferentially disposed channels, an intermittently rotated plate positioned in juxtaposition to said stationary guide plate, means on said last-named plate to engage the crowns on said guide plate to move them therealong in their respective channels, a plurality of punch and die sets so positioned as to operate through openings in the intermittently rotated plate to register with crowns positioned in the channels of said stationary guide plate to place spots in a plurality of crowns simultaneously, a cylindrical cam for imparting intermittent rotary motion to the rotating plate, and means for imparting reciprocatory motion to the punch and die sets.

5. In a device for applying spots to crown closures, the elements comprising a stationary guide plate having a plurality of substantially circumferentially disposed channels defined therein, means for simultaneously supplying one crown to each of said circumferentially disposed channels, a rotatable plate positioned in juxtaposition to said stationary guide plate, means on said last-named plate to engage the crowns on said guide plate to move them therealong in their respective channels, a plurality of punch and die sets so positioned as to operate through openings in the rotatable plate to register with crowns positioned in the channels of said stationary guide plate to place spots in a plurality of crowns simultaneously, and means for imparting rotary motion to the rotatable plate and reciprocatory motion to the punch and die sets.

References Cited in the file of this patent

UNITED STATES PATENTS

| Number | Name | Date |
|---|---|---|
| 1,053,565 | Bogdanffy | Feb. 18, 1913 |
| 1,118,778 | Johnson | Nov. 24, 1914 |
| 1,135,513 | Forrester | Apr. 13, 1915 |
| 2,147,566 | Williams et al. | Feb. 14, 1939 |
| 2,171,258 | Pearson | Aug. 29, 1939 |
| 2,391,340 | Pearson | Dec. 18, 1945 |
| 2,423,333 | Miller | July 1, 1947 |
| 2,567,141 | Andrew et al. | Sept. 4, 1951 |